May 13, 1952     G. F. SHOTTER ET AL     2,596,297
METHOD OF AND APPARATUS FOR MEASURING ELECTRICAL QUANTITIES
Filed Feb. 24, 1948     2 SHEETS—SHEET 1

May 13, 1952 G. F. SHOTTER ET AL 2,596,297
METHOD OF AND APPARATUS FOR MEASURING ELECTRICAL QUANTITIES
Filed Feb. 24, 1948 2 SHEETS—SHEET 2

George Frederick Shotter
Harry Donald Hawkes
by Peck & Peck
Att'ys

Patented May 13, 1952

2,596,297

UNITED STATES PATENT OFFICE 2,596,297

METHOD OF AND APPARATUS FOR MEASURING ELECTRICAL QUANTITIES

George Frederick Shotter, Great Mongeham, near Deal, and Harry Donald Hawkes, New Eltham, England Application February 24, 1948, Serial No. 10,218
In Great Britain May 13, 1939

Section 1, Public Law 690, August 8, 1946
Patent expires May 13, 1959

3 Claims. (Cl. 171—95)

This invention concerns an improved apparatus for measuring electrical quantities whereby errors to which the majority of instruments have hitherto been subject are eliminated or reduced.

It is an object of the present invention to provide an electrical measuring instrument which is independent of the usual errors of temperature, and coil expansion, and in which the torque of a measuring part is balanced by the torque of a direct current control part, but whose accuracy is independent of the stability of the said direct current part.

Another object of the invention is to provide an electric measuring instrument whose accuracy is limited only by the accuracy of resistances, of a standard current transformer and a direct current potentiometer and standard cell associated therewith. It is also an object of the invention to provide means for standardising alternating current measuring instruments against such a standard instrument.

Measuring electrical quantities according to the invention comprises mechanically connecting the moving elements of an ironless dynamometer type of instrument assembly and a direct current type of instrument assembly for common movement, electrically connecting all the windings of the two assemblies in series in such a way that the torque of the direct current instrument assembly opposes that of the dynamometer type assembly, passing a known value of direct current through the said series-connected windings, adjusting the torque of the direct current assembly to balance the torque of the dynamometer assembly, then disconnecting the said series connections and connecting the dynamometer assembly to the source of the electrical quantity to be measured, balancing the torque of the moving element of the dynamometer assembly by passing a direct current through the direct current assembly, and measuring the said direct current.

Thus it is possible at any instant, by a simple switching operation, to equalise the torque of the control part with that of the measuring part of the instrument, and therefore to eliminate the individual errors of the separate assemblies due to rise of temperature during use, or weakening of permanent magnets due to ageing.

According to the invention, an electrical measuring instrument comprises a measuring part constituted by an ironless dynamometer type of instrument assembly, a control part constituted by a direct current type of instrument assembly, a positive connection between the moving elements of the two said assemblies to effect their common movement, means for connecting at will all the coils of both instrument assemblies in series, and means for adjusting the torque of the control part assembly to balance that of the measuring part assembly when so connected.

The means for adjusting the torque of the control part assembly preferably comprises a magnetic shunt which is variable to vary the strength of the magnetic field of the assembly.

The invention also provides a means of standardising instruments for measuring electric currents, voltages, or powers which consists in applying the current, voltage, or power to the instrument to be standardised and to the measuring part of a standard electric measuring instrument constructed as previously described, measuring the value of the said current, voltage or power by means of direct current standard apparatus connected in circuit with the control part of the said standard instrument, and comparing the indications of the instruments to be standardised with those of the standard instrument.

Preferably, the current in the control part of the standard instrument is first adjusted to correspond to a selected value of the current, voltage, or power, and the source of supply thereof is then adjusted until the torque on the respective element of the measuring part exactly balances the torque of the control part and the indication of the instrument being standardised is compared with the said selected value.

In order that the invention may be more clearly understood, one form of apparatus embodying the same will now be described by way of example, with reference to the accompanying drawings in which.

Figure 4:
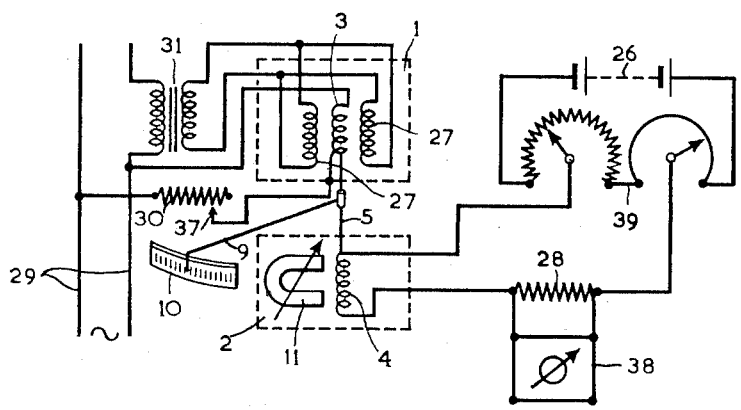
Figure 5:
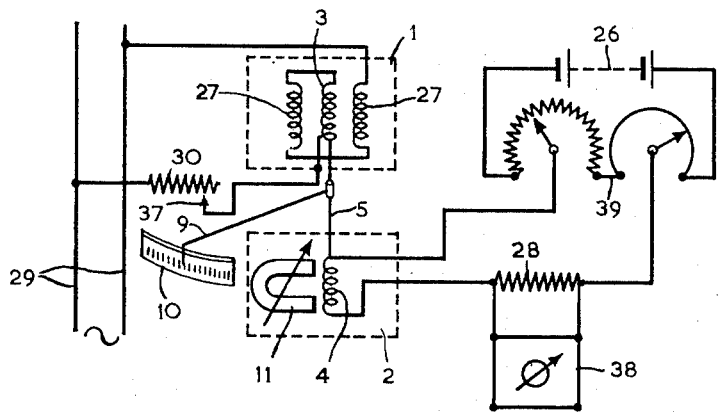

Fig. 4 is a diagram of the circuit connections for measuring the power in an A. C. circuit; and Fig. 5 is a diagram of the circuit connections for measuring the voltage in an A. C. circuit.

Figure 1:
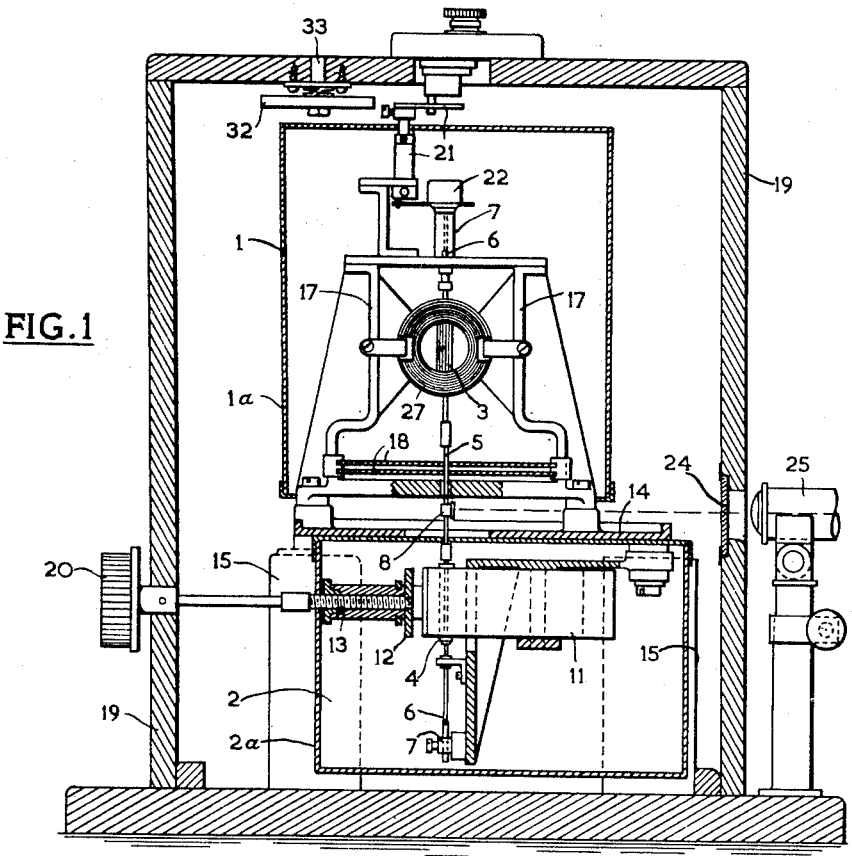
Fig. 1 shows a view, partly in section, of an instrument constructed in accordance with the invention.
Figure 2:
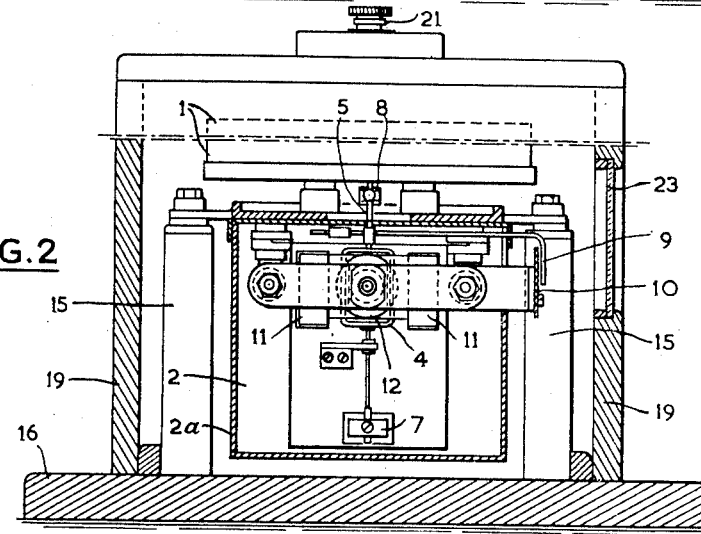
Fig. 2 is a part-sectional view looking from the left of Fig. 1.
Figure 3:
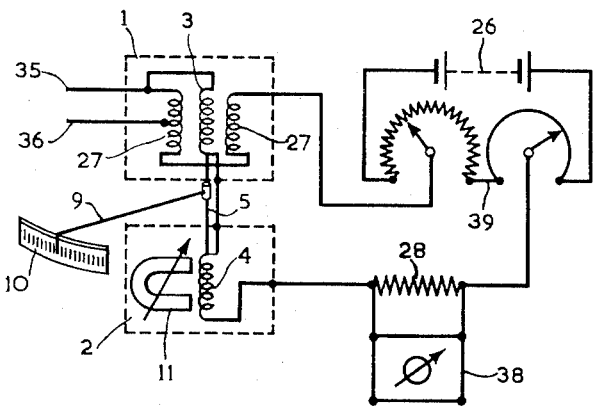
Fig. 3 is a diagram of the circuit connections for the checking of the instrument.

The instrument illustrated in Figs. 1 and 2 and shown diagrammatically in Fig. 3, consists essentially of two parts, 1, 2, each comprising a moving coil instrument, mounted one above the other with their moving coils 3, 4 in the same plane and rigidly secured on a vertical rod or bar 5, for example of the metal sold under the registered trade-mark Duralumin, supported at its ends by a usual form of double taut suspension 6, for example of Phosphor bronze. The suspension 6 is clamped at the ends in suitable fixtures 7, and provision is made (as described below) for adjustment to bring the coils into the accurate zero position when no torque is exerted on them. The two moving coils 3, 4 are suspended so as to be capable of common rotation about a vertical axis. Between the two coils 3, 4, the bar 5 carries a small mirror 8 adapted to reflect a beam of light on to a graduated screen (not shown) in a manner well known in the art. A pointer 9 is mounted immediately above the coil 4 and moves over a vertical arcuate scale 10.

The upper part 1 constitutes a normal dynamometer type of instrument whilst the lower part 2 is a permanent magnet moving coil type of measuring instrument. Each part 1, 2 of the instrument is enclosed in a screening box 1a, 2a made of iron or other high permeability material, for example, the alloy sold under the registered trade mark "Mumetal." The screening of the dynamometer part 1 is particularly important so as to render it as immune as possible from the effects of external fields. The magnet 11 of the permanent magnet assembly is provided with a magnetic shunt in the form of a disc 12 of magnetic material which can be moved up to or away from the pole pieces by a screw threaded spindle 13, for adjustment of the torque of the instrument, as described later.

The lower part 2 of the instrument is mounted on the underside of a plate 14 which is supported on pillars 15 carried on a base 16. The upper side of this plate 14 supports a substantially U-shaped bracket 17 on which is mounted the upper part 1 of the instrument and its screening casing 1a. In a space between the base of the bracket 17 and the plate 14 is mounted the mirror 8 while immediately above the said base are two horizontal magnetic screens 18 which provide an additional safeguard against magnetic interaction between the permanent magnet 11 and the moving coil 3.

It is essential that the construction of the dynamometer part of the instrument is such that the torque produced by a given R. M. S. value of alternating current is exactly the same as that produced by a direct current of the same value.

The whole instrument is enclosed in a wooden case 19, and through this case 19 projects the knob 20 for adjusting the magnet shunt 12, and a control mechanism, generally indicated by 21, for rotating the adjusting head 22 of the suspension 6. The scale 10 is observed through a window 23 in the case 19, while a second window 24 allows the passage on to the mirror 8 of a beam of light from a projector 25. To guard against the effects on the moving coil 3 of any possible magnetic leakage through the screening, a small bar magnet 32 is mounted on a spindle 33 in the top of the case 19 and can be rotated to neutralise any stray field which may penetrate the screening 1a, 2a.

Compensation for change in resistance of the dynamometer coils due to temperature changes is conveniently effected by adjustment of a variable tap 37 on a resistance 30 (see Figures 4 and 5), this tap is moved in accordance with the value of the voltage drop, measured by a potentiometer, across taps 35, 36 (Figure 3) on one of the fixed coils 27 when a known value of direct current is passed through the coils 27.

The instrument is designed to detect differences of the order of a few parts in 100,000 of the normal full load current of the instrument and to measure changes of current, voltage or power of the order of a few parts in 10,000 of the normal full load value.

In use, the instrument is first placed in a convenient position, a D. C. current approximating in value to that of the standard current (referred to below) is passed through the moving coil 3, and the magnet 32 is adjusted to compensate for the effect of any stray magnetic field on the moving coil 3. It is then standardised by connecting the fixed coils 27, the moving coil 3 of the dynamometer part 1 and the moving coil 4 of the D. C. part 2 in series (see Fig. 3) but with the moving coil 4 of the D. C. part 2 in opposition, to a source of direct current supply 26 through a standard resistance 28 and a potentiometer arrangement 39. A selected value of direct current is then passed through the instrument, this value being accurately measured by means of a voltage measuring device 38 which comprises a direct current potentiometer and a standard cell connected across the standard resistance 28. The torque which is produced by the dynamometer part 1 when the coils 3, 27 are in a selected relative position (preferably the position of zero mutual induction between the fixed and moving coils) is regarded as the standard torque of the instrument for a standard current (measured by the voltage measuring device 38) at the time when the instrument is to be used. The D. C. control part 2 is then standardized by adjustment of the magnetic shunt 12 until the torque of this D. C. part exactly balances the torque of the dynamometer part 1 at the selected position of the moving coil 3 with respect to the fixed coils 27. The instrument is now standardised for current measurement and is used without disturbing the adjustment of the magnetic shunt 12 or the stray field magnet 32.

Where the standardisation of the instrument 1, 2 is for voltage or power measurements, any change in resistance, due to temperature changes, of the dynamometer coils 3, 27 may require compensation. It is then convenient at this stage, when the current through the coils 27 is at the standard value, to measure the voltage drop between the taps 35, 36 by means of a potentiometer and to adjust the tap 37 of the resistance 30 in series with the moving coil 3 accordingly.

The direct current part 2 thus provides a means for measuring the torque produced by the dynamometer part 1, said torque bearing a known fixed relationship to the value of current flowing in the dynamometer part. The circuit is then disconnected, and the instrument is connected to the supply of current, voltage or power which it is required to measure.

In the circuit diagram shown in Fig. 4 for the measurement of the power in an A. C. circuit 29, the moving coil 3 of the dynamometer part is connected in series with the resistance 30 across the circuit 29, while the fixed coils 27 are, in this example, connected in parallel across the secondary terminals of a standard current transformer 31 whose primary is connected in series with the load. The fixed coils 27 may, if preferred, be connected in series.

The coil 4 of the permanent magnet part is excited by a direct current from the source 26 whose direction of flow is such that it produces a control torque in the coil 4 in opposition to the torque produced in the moving coil 3 of the dynamometer part. A beam of light is directed on to the mirror 8 and reflected back on to a graduated screen (not shown), and the value of the direct current from the source 26 is adjusted until the spot on the screen is brought to the zero position. The torques produced by the currents in the two parts 1, 2 of the instrument exactly balance, and the value of the power being measured is proportional to the value of direct current through the moving coil 4 of the D. C. part 2. This current is accurately measured by means of the voltage measuring device 38 connected across the standard resistance 28.

In the circuit diagram shown in Fig. 5 for the measurement of the voltage in the A. C. circuit 29, the fixed and moving coils 27 and 3 of the dynamometer part are connected in series through the resistance 30 across the A. C. circuit 29. The connections of the D. C. part 2 are the same as those for measuring power, and the same procedure is adopted for bringing the spot on the scale to the zero or null position. The voltage drop across the standard resistance 28 is measured as before, and its value is proportional to the square of the A. C. voltage being measured. It will be understood that the procedure for measuring the current in circuit 29 is identical with that for voltage measurement with the exception that the dynamometer coils are connected to a standard current transformer which is connected in series with the load, the resistance 30 being omitted.

In certain circumstances the voltage measuring device 38 may be calibrated to read directly the value of the quantity being measured by the instrument. Instead of a comparator comprising a potentiometer and a standard cell, other means may be employed for measuring the value of the current producing the balancing torque in the D. C. part 2, for example, a standard ammeter.

The instrument according to the invention is primarily intended for use in calibrating A. C. ammeters, voltmeters, and wattmeters. For such purposes the circuit connections of the instrument 1, 2 are the same as those already described, the instrument under test being connected in the usual way in the A. C. circuit 29. The calibration may be carried out in various ways. Thus, for example, the instrument 1, 2 may first be connected as shown in Fig. 3, with its coils in series, to a source of D. C. supply. A known current, for example 50 milliamperes, which corresponds to the full scale deflection of the instrument to be tested, is then passed through the circuit, the value being accurately measured by means of the voltage measuring device 38 connected across the standard resistance 28. The magnet shunt 12 is then adjusted to bring the moving coil system 3, 4 into the zero or null position.

Where the instrument to be calibrated is a voltmeter or wattmeter, compensation is made for temperature changes in the manner already described in connection with standardisation of the instrument 1, 2 for voltage or power measurements.

The A. C. circuit is then adjusted to cause approximately that value of current, voltage, or power to be present therein which corresponds to the full scale deflection of the instrument to be tested. The A. C. and D. C. circuits are then opened, and the dynamometer part 1 is connected to the A. C. circuit in the appropriate manner. Both circuits are then closed, the D. C. circuit is adjusted until a current of 50 milliamperes is flowing through the moving coil 4, as measured by the potentiometer 38 or the like voltage measuring device connected across the standard resistance 28, and the A. C. circuit is adjusted until the moving coil system 3, 4 is brought to the zero or null position. The error in the deflection of the instrument under test is then read off.

It will be understood that the values of the resistance 30 and, where used, the ratio of the standard current transformer 31 may be so chosen that a given voltage drop across the standard resistance 28, as measured by the potentiometer 38 connected thereto, may correspond to a particular value of A. C. current, voltage or power. With these values of resistance and transformer ratio in use, therefore, the potentiometer 38 may be calibrated to read directly in terms of the current, voltage or power in the A. C. circuit.

This method thus enables A. C. measuring instruments to be standardised when connected in A. C. circuits and therefore has obvious advantages over the method used hitherto which has been to compare the alternating current instrument with standard direct current apparatus when connected in circuit with a supply of direct current.

Although the two parts of the instrument have been specifically described as constituted by a dynamometer and a permanent magnet moving coil instrument respectively, it is to be understood that other desired combinations of instrument may be used. For example the permanent magnet may be replaced by an electro-magnet assembly. In this case the magnetic shunt device for adjusting the null position of the instrument may be replaced by a variable resistance in series with the exciting winding of the electro-magnet. This magnet may be excited from a separate supply of direct current from that to which the moving coil is connected in order to avoid a "square law" variation in the control torque.

The apparatus according to the invention has several advantages over known types of instrument. In particular, the elimination of dependence on control springs for the exertion of the control torque removes one of the most common sources of temperature errors in measuring instruments. Other temperature errors, such as expansion of the coils and errors due to ageing of permanent magnets, are eliminated, as already indicated, by the self-checking feature of the instrument whereby the control torque is always equalised with the actual torque produced in the measuring part by an accurately measurable value of current. The errors of the instrument are, therefore, automatically taken into account, and the accuracy of the instrument is limited solely by the accuracy of the associated resistances, standard current transformer, and D. C. potentiometer and standard cell which are used to measure the direct current.

Moreover, since the indication of the instrument is always read at the instant when the moving coil system has been brought back to the zero or null position, the current/torque characteristics of the dynamometer and permanent magnet assemblies always follow a true square law and a true linear law respectively. Hence the control torque need only be standardised against the measuring part at one chosen value of current, and since the characteristics of the two parts follow different laws, the point of balance is sharply marked.

There are no errors due to pivot friction, and the accuracy of the instrument is entirely independent of any control exercised by the suspension.

What we claim is:

1. An electrical measuring instrument comprising a measuring part constituted by an ironless moving coil, dynamometer-type instrument assembly, a control part constituted by a direct current type instrument assembly, means for adjusting the torque of the control part independently of adjustment of the current therethrough, a mechanical connection between the moving elements of the two assemblies for combining the torques thereof, means for connecting at will all the coils of the two parts in series and to a source of direct current or the coils of the dynamometer assembly to the circuit of which an electrical quantity is to be measured, and the control part to a source of current and means to measure or indicate the current flowing in the control part comprising a resistance connected in series with the moving coil of the direct current type instrument assembly, and potentiometer and standard cell apparatus connected across said resistance.

2. An electrical measuring instrument comprising a measuring part constituted by an ironless moving coil, dynamometer-type instrument assembly, a control part constituted by a direct current type instrument assembly, means for adjusting the torque of the control part independently of adjustment of the current through the moving coil thereof comprising means to vary the magnetic field of the magnet of said control part, a mechanical connection between the moving elements of the two assemblies for combining the torques thereof, means for connecting at will all the coils of the two parts in series and to a source of direct current or the coils of the dynamometer assembly to the circuit of which an electrical quantity is to be measured, and the control part to a source of current and means to measure or indicate the current flowing in the control part.

3. An electrical measuring instrument comprising a measuring part constituted by an ironless moving coil, dynamometer-type instrument assembly, a control part constituted by a permanent magnet direct current type instrument assembly, means for adjusting the torque of the control part independently of adjustment of the current through the moving coil thereof, comprising a magnetic shunt and means to adjust it with respect to the poles of the permanent magnet, a mechanical connection between the moving elements of the two assemblies for combining the torques thereof, means for connecting at will all the coils of the two parts in series and to a source of direct current or the coils of the dynamometer assembly to the circuit of which an electrical quantity is to be measured, and the control part to a source of current and means to measure the current flowing in the control part.

GEORGE FREDERICK SHOTTER.
HARRY DONALD HAWKES.

REFERENCES CITED

The following references are of record in the file of this patent:

UNITED STATES PATENTS

| Number | Name | Date |
|---|---|---|
| 1,906,596 | Hoare | May 2, 1933 |
| 1,929,292 | St. Clair | Oct. 3, 1933 |

FOREIGN PATENTS

| Number | Country | Date |
|---|---|---|
| 274,575 | Great Britain | July 25, 1927 |
| 532,623 | Great Britain | Jan. 28, 1941 |